United States Patent [19]

Wu et al.

[11] Patent Number: 4,761,455

[45] Date of Patent: Aug. 2, 1988

[54] POLY(VINYL CHLORIDE) COMPOSITIONS AND POLYMERIC BLENDING AGENTS USEFUL THEREFOR

[75] Inventors: Muyen M. Wu, Hudson; George S. Li, Solon, both of Ohio

[73] Assignee: The Standard Oil Company, Cleveland, Ohio

[21] Appl. No.: 60,889

[22] Filed: Jun. 12, 1987

[51] Int. Cl.$^4$ .................. C08L 27/06; C08L 51/04; C08F 279/02
[52] U.S. Cl. ........................................ 525/75; 525/289
[58] Field of Search ................................ 525/289, 75

[56] References Cited

U.S. PATENT DOCUMENTS

| | | | |
|---|---|---|---|
| 3,947,527 | 3/1976 | Li et al. | 525/289 |
| 3,950,454 | 4/1976 | Hensley et al. | 525/289 |
| 4,020,128 | 4/1977 | Aziz et al. | 525/289 |
| 4,074,038 | 2/1978 | Li | 526/280 |
| 4,100,226 | 7/1978 | Li | 525/289 |
| 4,107,237 | 8/1978 | Li | 525/289 |
| 4,596,856 | 6/1986 | Wu et al. | 525/211 |
| 4,603,186 | 7/1986 | Wu et al. | 526/280 |

*Primary Examiner*—Carman J. Seccuro
*Attorney, Agent, or Firm*—C. S. Lynch; D. J. Untener; L. W. Evans

[57] ABSTRACT

Disclosed are normally solid polymers that are the result of addition copolymerization of the monomers acrylonitrile, methyl methacrylate, α-methylstyrene and/or styrene, and indene in the presence of a preferred unsaturated rubbery polymer, said polymers containing 10–200 parts by weight rubbery polymer, 10–40 parts by weight acrylonitrile, 5–50 parts by weight methyl methacrylate, 5–45 parts by weight of one or both of styrene and α-methylstyrene and 4–45 parts by weight indene in the polymer structure, per 100 parts by weight of the total parts of acrylonitrile, methyl methacrylate, styrene, α-methylstyrene and indene combined in said polymer structure. Also disclosed are vinyl chloride polymers compounded therewith to increase the heat distortion temperature as well as the impact resistance.

4 Claims, No Drawings

POLY(VINYL CHLORIDE) COMPOSITIONS AND POLYMERIC BLENDING AGENTS USEFUL THEREFOR

This invention relates to poly(vinyl chloride) plastic (PVC) molding compositions having improved performance characteristics, including a higher heat distortion temperature (HDT) and good notched Izod impact resistance.

The invention further relates to unique polymeric blending agents which in one material can impart such properties to a PVC compound. Usually one additive is needed to improve HDT and a second additive to improve impact resistance. In general, our polymeric blending agents have themselves substantially no impact resistance, but impart good impact resistance when compounded with PVC, as well as excellent HDT values.

Poly(vinyl chloride) resins are well known to be useful to mold many end products such as bottles, film sheet, pipe, structural moldings. However, the normal poly(vinyl chloride) resin compositions used to make rigid end products have too low a heat distortion temperature for use in applications under heat and load because the shape of the product will become distorted when approaching the heat distortion temperature. For instance, it would be desirable to have poly(vinyl chloride) compositions in molded shapes such as pipe and bottles that will stand a higher temperature in service than the standard poly(vinyl chloride) resins having a normal 65° to 70° or 71° heat distortion temperature and at the same time, many such molded shapes require excellent notched Izod impact resistance. In this art it has proven very difficult to make PVC molding compounds simultaneously having excellent HDT and good impact resistance, even when using a separate additive for each purpose.

It is an object of the present invention to provide rigid poly(vinyl chloride) compositions having improved properties, including a higher heat distortion temperature and good impact resistance.

It is a further object to provide a single polymeric blending agent that will impart both properties to PVC when compounded therewith.

Other objects, as well as aspects, features and advantages of the present invention, will become apparent from a study of specification, including the examples and the claims.

The objects numerated above, and other objects, are realized according to one aspect of the present invention by providing a composition or blend of a vinyl chloride polymer and certain random copolymers containing indene as one of the monomers, and formed by polymerization in the presence of a preformed rubbery polymer.

The vinyl chloride resin of the blend of the invention can be a homopolymer of vinyl chloride or a copolymer of vinyl chloride with a minor portion of one or more monomers copolymerizable with vinyl chloride. In such copolymers vinyl chloride comprises on a weight basis at least about 80 (preferably at least 90) percent of the copolymer and the copolymerizable monomer comprises up to about 20 (preferably up to about 10) percent. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl ethers such as vinyl isobutyl ether, vinyl lauryl ether, and vinyl cetyl ether; acrylic acid and methacrylic acid; acrylonitrile and methacrylonitrile; diethyl fumarate; maleic anhydride; dimethyl itaconate; styrene; N-vinyl carbazole; N-vinyl pyrrolidone; or mixtures thereof.

Methods for the preparation of vinyl chloride polymers are well known in the art and reported in the literature. See for example: *Kirk Othmer, Encyclopedia of Chemical Technology,* Third Edition, Interscience Publishers, Volume 23, pages 886-936, (Copyright 1983), the disclosures of which are incorporated herein by reference. Vinyl chloride polymers are available from a number of commercial suppliers. For preparing blends of this invention for use in injection molding operations, the vinyl chloride polymer usually has an inherent viscosity (as measured at a concentration of 0.5 gram per 100 grams of cyclohexanone at 25° C.) in the range of about 0.40 to 0.70 and more usually in the range of about 0.50 to 0.70. Blends of such injection molding grade poly(vinyl chloride) homopolymer with our new polymeric blending agents are particularly useful. Blends of our new polymers with extrusion grade vinyl chloride polymers are also very useful, and the extrusion grade vinyl chloride polymers used in such blends generally have viscosities in the inherent viscosity range from over 0.70 to 1.2, measured on the same basis. The present blends usually use a vinyl chloride polymer having an inherent viscosity of 0.54 to 1.

The polymeric blending agents used in the blends of the present invention are polymers that are the result of addition polymerization of the monomers acrylonitrile, methyl methacrylate, α-methylstyrene and/or styrene, and indene in the presence of a rubbery polymer.

As used herein inherent viscosity is in deciliters per gram of polymer composition.

According to one aspect of the present invention there are provided normally solid polymers that are the result of addition copolymerization of the monomers acrylonitrile, methyl methacrylate, α-methylstyrene and/or styrene, and indene in the presence of a preformed rubber polymer, said polymers containing 10-200 parts by weight rubbery polymer, 10°40 parts by weight acrylonitrile, 5-50 parts by weight methyl methacrylate, 5-45 parts by weight of one or both of styrene and α-methylstyrene and 4-45 parts by weight indene in the polymer structure, per 100 parts by weight of the total parts of acrylonitrile, methyl methacrylate, styrene, α-methylstyrene and indene combined in said polymer structure. Thus, the rubbery polymer is expressed in excess of 100 percent of the monomer materials combined in the polymer structure.

The rubbery polymer used in making the polymeric blending agents of the invention include (1) a rubbery polymer of from 50 to 100% by weight of at least one member selected from the group consisting of butadiene and isoprene and from 0 to 50% by weight of at least one member selected from the group consisting of an olefinic nitrile such as acrylonitrile, an ester of an acrylic acid such as ethyl acrylate, and styrene, (2) a homopolymer of an ester of an acrylic acid such as polyethyl acrylate, (3) butyl rubber or chlorinated butyl rubber, and (4) an ethylene-propylene-diene rubber, wherein the amount of diene used is limited so that the rubber polymer has an iodine number not greater than about 20. We usually use rubbery polymers made with a a diene as one of the monomers.

The usual parts by weight of the rubbery polymer on the same basis in parts by weight of 16–120. Generally, however, at least 20 or 25 parts of rubbery polymer on the same basis are used in our blending agents. Also, on the same basis, the usual lower limits of acrylonitrile, methyl methacrylate, and indene are 15, 10 and 10, respectively, while the usual upper limits of acrylonitrile and of styrene plus α-methylstyrene are 30 and 40, respectively.

According to an important aspect of the present invention there is provided a composition comprising an intimate admixture of (a) 50 to 98 parts by weight of a vinyl chloride polymer having inherent viscosity of at least 0.4 and (b) 50 to 2 parts by weight of an addition polymer described in the last two paragraphs.

The vinyl chloride polymer compositions of this invention can include other ingredients, such as impact modifiers, thermal stabilizers, processing aids, fillers, lubricants, pigments, flame retardants, reinforcing fibers, smoke retardants, antioxidants, and the like.

The vinyl chloride polymer compositions of this invention can also contain fillers. Examples are calcium carbonate, wollastonite, silicates such as talc, acicular calcium silicate, titanium dioxide, potassium titanate, and glass flakes. Amounts of such fillers of up to about 50 parts per 100 parts of the combined vinyl chloride polymer plus the blending agent.

In the polymeric blending agents of our invention, we have found that the indene and the α-methylstyrene and/or the styrene and the main components increasing the HDT, while the polar compounds, acrylonitrile and methylacrylate contribute to compatibility with the vinyl chloride polymer, thus helping to maintain other physical mechanical properties. One reason that acrylonitrile alone cannot be used to supply the needed polarity is that too much acrylonitrile also makes the polymer less compatible with the vinyl chloride polymer. The reason that indene alone cannot be used as the HDT modifier component is that when the indene content of the additive polymer becomes too high, the polymer tends to become much less compatible with the vinyl chloride polymer, and the use of some α-methylstyrene alleviates this problem, although the reason is not well understood. The preformed rubbery component of the polymeric blending agent raises the impact resistance without lowering the HDT, contrary to most impact modifiers. In fact, of course, our polymeric blending agents improve both properties.

Properties reported in this application were determined by the procedures of the following ASTM designations:

Heat Distortion Temperature: ASTM D 648 (264 psi, annealed) at 80° C. for 24hrs)
Tensile Strength: ASTM D 638 (Modified)
Flexural Strength: ASTM D 790
Flexural Modulus: ASTM D 790
Melt Index: ASTM D 1238
Notched Izod: ASTM D 258

The following examples of the compositions of the invention are merely illustrative and are not to be considred limiting.

In the examples unless otherwise stated, the PVC used in the blends was an injection grade PVC having an inherent viscosity of 0.68 deciliters/gm. for a 0.5 weight percent solution in cyclohexanone, and when stabilized with 2.5 parts by weight of Thermolite T-35, 0.8 parts calcium stearate, 0.4 parts Wax-OP, and 0.6 parts Metalblen L-1000, each per 100 parts of PVC, the PVC had a tensile strength of 8,600 psi, and annealed HDT of 73° C., a flexural strength of 13,600 psi, a flexural modulus of 410,000 psi, a notched Izod of 0.2 ft-lbs/sq. in., and a melt index of 0.26 grams/10 minutes.

In the examples the term "phm" means weight parts per 100 parts of total monomers in the total recipe given, exclusive of the pre-formed rubbery polymer. The rubbery polymer is also expressed in terms of "phm" in such recipe.

In characterizing the polymeric blending agents of the invention, for the purposes of making comparisons between polymers of the invention and similar polymers having no preformed rubbery polymer, the composition is expressed in terms of weight percentage of each monomer combined in the polymer, exclusive of the rubbery polymer. The rubbery polymer in the polymeric blending agent is expressed as the weight percentage excess over 100 percent of the polymerized monomers exclusive of the rubbery polymer. Also, "AN" means acrylonitrile, "MMA" means methyl methacrylate, and "α-MS" means α-methylstyrene.

In the recipes of the examples, the water includes all of the water, including that introduced with the rubbery polymer latex.

In the examples disclosing the compounded vinyl chloride polymers blended with the polymeric blending agents of the invention, Metalblen L-1000 is an acrylic polymer lubricant, Wax-OP is a partially saponified ester wax derived from montan wax, and Thermolite T-35 is $(C_8H_{17}SCH_2COO)_2Sn(C_4H_9)_2$, a thermal stabilizer.

In the examples in which PVC was compounded with the polymeric compositions of the invention, are indicated amount of PVC, blending agent (polymeric composition of the invention), was mixed with the following additives in the amount indicates per 100 weight parts of the PVC plus blending agent.

| Additive | Weight Parts |
|---|---|
| Thermolite T-35 | 2.5 |
| Calcium Stearate | 0.8 |
| Wax-OP | 0.4 |
| Metalblen L-1000 | 0.6 |

The compounded mixtures were then blended on a heated two-roll mill at about 170° C., then compression molded into plaques at about 180° C. These were cut into suitable shapes for the various physical tests.

EXAMPLE 1

A polymer was made by emulsion polymerization using the following recipe in which amounts are shown in parts by weight:

| | Parts | |
|---|---|---|
| Water | 188 | |
| AN | 25 | |
| MMA | 20 | |
| Indene | 25 | |
| α-MS | 30 | |
| $Na_3PO_4 \cdot 12H_2O$ | 1 | |
| $Na_2S_2O_8$ | 1.2 | |
| Sodium Lauryl Sulfate | 1 | |
| Polybutadiene latex | 50 | (solids basis) |

The sodium lauryl sulfate and the sodium phosphate were dissolved in water and charged to a glass reactor fitted with a reflux condenser and a stirrer, and the stirrer was started. The rubbery polybutadiene latex was charged to the reactor next and the reactor contents placed under a nitrogen atmosphere.

The reactor was charged with part of the monomers: a mixture of 20 phm AN, 15 phm MMa, 10 phm α-MS and 25 phm indene, and the reactor contents heated to 75° C.

Polymerization was initiated by adding 0.7 phm of the $Na_2S_2O_8$. After this addition, a mixture of the remainder of the monomers (5 phm AN, 5 phm MMa and 20 phm α-MS) was added in equal portions according to the schedule:
1 hr.
2 hr.
3 hr.
4.5 hr.
5.75 hr.

Also, at the end of 3 hours from the initial charge of $Na_2S_2O_8$, 0.3 phm of the initiator was added, and at the end of 5 hours from the initial charge 0.2 phm of the initiator was added.

After 7 hours, the polymerization reached a monomer conversion of 79 percent as determined by solids measurements.

The composition of the polymeric product in weight percent was 25 AN/21 MMA/35 α-MS/20 indene and 63.4 excess percent polybutadiene.

EXAMPLE 2

A polymer was made by emulsion polymerization using the following recipe in which amounts are shown in parts by weight:

|  | Parts |  |
| --- | --- | --- |
| Water | 188 |  |
| AN | 25 |  |
| MMA | 20 |  |
| Indene | 25 |  |
| α-MS | 30 |  |
| $Na_3PO_4.12H_2O$ | 1 |  |
| $Na_2S_2O_8$ | 1.2 |  |
| Sodium Lauryl Sulfate | 1 |  |
| Polybutadiene latex | 50 | (solids basis) |

The sodium lauryl sulfate and the sodium phosphate were dissolved in water and dissolved in water and charged to a glass reactor fitted with a reflux condenser and a stirrer, and the stirrer was started. The rubbery polybutadiene latex was charged to the reactor next and the reactor contents placed under a nitrogen atmosphere.

The reactor was charged with part of the monomers: a mixture of 20 phm AN, 15 phm MMA, 10 phm α-MS and 25 phm indene, and the reactor contents heated to 75° C.

Polymerization was initiated by adding 0.7 phm of the $Na_2S_2O_8$. After this addition, a mixture of the remainder of the monomers (5 phm AN, 5 phm MMa and 20 phm α-MS) was added in equal portions according to the schedule:
1 hr. 5 min
2 hr. 5 min
3 hr. 5 min
4 hr. 22 min
5 hr. 22 min Also, at the end of 3 hours 3 min. from the initial charge of $Na_2S_2O_8$, 0.3 phm of the initiator was added, and at the end of 5 hours 22 min. from the initial charge 0.2 phm of the initiator was added.

After 7 hours 35 min, the polymerization reached a monomer conversion of 83 percent as determined by solids measurements.

The composition of the polymeric product in weight percent was 25 AN/21 MMA/35 α-MS/20 indene and 60.3 excess percent polybutadiene.

EXAMPLE 3

A polymer was made by emulsion polymerization using the following recipe in which amounts are shown in parts by weight:

|  | Parts |  |
| --- | --- | --- |
| Water | 188 |  |
| AN | 25 |  |
| MMA | 20 |  |
| Indene | 25 |  |
| α-MS | 30 |  |
| $Na_3PO_4.12H_2O$ | 1 |  |
| $Na_2S_2O_8$ | 1.2 |  |
| Sodium Lauryl Sulfate | 1 |  |
| Polybutadiene latex | 60 | (solids basis) |

The sodium lauryl sulfate and the sodium phosphate were dissolved in water and dissolved in water and charged to a glass reactor fitted with a reflux condenser and a stirrer, and the stirrer was started. The rubbery polybutadiene latex was charged to the reactor next and the reactor contents placed under a nitrogen atmosphere.

The reactor was charged with part of the monomers: a mixture of 20 phm AN, 15 phm MMA, 10 phm α-MS and 25 phm indene, and the reactor contents heated to 75° C.

Polymerization was initiated by adding 0.7 phm of the $Na_2S_2O_8$. After this addition, a mixture of the remainder of the monomers (5 phm AN, 5 phm MMA and 20 phm α-MS) was added in equal portions according to the schedule:
1 hr. 8 min
2 hr. 10 min
3 hr. 10 min
4 hr. 10 min
6 hr. 20 min Also, at the end of 3 hours 10 min from the initial charge of $Na_2S_2O_8$, 0.3 phm of the initiator was added, and at the end of 5 hours 10 min from the initial charge 0.2 phm of the initiator was added.

After 8 hours 15 min, the polymerization reached a monomer conversion of 80 percent as determined by solids measurements.

The composition of the polymeric product in weight percent was 25 AN/21 MMA/35 α-MS/20 indene and 75.1 excess percent polybutadiene.

EXAMPLE 4

A polymer was made by emulsion polymerization using the following recipe in which amounts are shown in parts by weight:

|  | Parts |
| --- | --- |
| Water | 200 |
| AN | 25 |

|  | Parts |  |
|---|---|---|
| MMA | 20 |  |
| Indene | 25 |  |
| α-MS | 30 |  |
| Na₃PO₄.12H₂O | 1 |  |
| Na₂S₂O₈ | 1.2 |  |
| Sodium Lauryl Sulfate | 1 |  |
| Polybutadiene latex | 40 | (solids basis) |

The sodium lauryl sulfate and the sodium phosphate were dissolved in water and dissolved in water and charged to a glass reactor fitted with a reflux condenser and a stirrer, and the stirrer was started. The rubbery polybutadiene latex was charged to the reactor next and the reactor contents placed under a nitrogen atmosphere.

The reactor was charged with part of the monomers: a mixture of 20 phm AN, 15 phm MMA, 10 phm α-MS and 25 phm indene, and the reactor contents heated to 75° C.

Polymerization was initiated by adding 0.6 phm of the Na₂S₂O₈. After this addition, a mixture of the remainder of the monomers (5 phm AN, 5 phm MMA and 20 phm α-MS) was added in equal portions according to the schedule:
1 hr.
2 hr. 15 min.
3 hr. 30 min.
4 hr. 45 min.
6 hr.

Also, at the end of 3 hours 45 min from the initial charge of Na₂S₂O₈, 0.06 phm of the initiator was added.

After 7 hours 15 minutes, the polymerization reached a monomer conversion of 84 percent as determined by solids measurements.

The composition of the polymeric product in weight percent was 25 AN/21 MMA/35 α-MS/20 indene and 47.7 excess percent polybutadiene.

EXAMPLE 5

A polymer was made by emulsion polymerization using the following recipe in which amounts are shown in parts by weight:

|  | Parts |  |
|---|---|---|
| Water | 200 |  |
| AN | 25 |  |
| MMA | 20 |  |
| Indene | 25 |  |
| α-MS | 30 |  |
| Na₃PO₄.12H₂O | 1 |  |
| Na₂S₂O₈ | 1.2 |  |
| Sodium Lauryl Sulfate | 3 |  |
| Polybutadiene latex | 40 | (solids basis) |

The sodium lauryl sulfate and the sodium phosphate were dissolved in water and charged to a glass reactor fitted with a reflux condenser and a stirrer, and the stirrer was started. The rubbery polybutadidne latex was charged to the reactor next and the reactor contents placed under a nitrogen atmosphere.

The reactor was charged with part of the monomers: a mixture of 20 phm AN, 15 phm MMA, 10 phm α-MS and 25 phm indene, and the reactor contents heated to 75° C.

Polymerization was initiated by adding 0.7 phm of the Na₂S₂O₈. After this addition, a mixture of the remainder of the monomers (5 phm AN, 5 phm MMA and 20 phm α-MS) was added in equal portions according to the schedule:
1 hr. 5 min
2 hr. 20 min
3 hr. 40 min
5 hr.
6 hr. 20 min Also, at the end of 4 hours 30 min. from the initial charge of Na₂S₂O₈, 0.5 phm of the initiator was added.

After 7 hours 30 min., the polymerization reached a monomer conversion of 80.8 percent as determined by solids measurements.

The composition of the polymeric product in weight percent was 25 AN/21 MMA/35 α-MS/20 indene and 52.6 excess percent polybutadiene.

EXAMPLE 6

A polymer was made by emulsion polymerization using the following recipe in which amounts are shown in parts by weight:

|  | Parts |  |
|---|---|---|
| Water | 200 |  |
| AN | 25 |  |
| MMA | 20 |  |
| Indene | 25 |  |
| α-MS | 30 |  |
| Na₂PO₄.12H₂O | 1 |  |
| Na₂S₂O₈ | 1.2 |  |
| Sodium Lauryl Sulfate | 3 |  |
| Polybutadiene latex | 20 | (solids basis) |

The sodium lauryl sulfate and the sodium phosphate were dissolved in water and dissolved in water and charged to a glass reactor fitted with a reflux condenser and a stirrer, and the stirrer was started. The rubbery polybutadiene latex was charged to the reactor next and the reactor contents placed under a nitrogen atmosphere.

The reactor was charged with part of the monomers: a mixture of 20 phm AN, 15 phm MMA, 10 phm α-MS and 25 phm indene, and the reactor contents heated to 75° C.

Polymerization was intiated by adding 0.7 phm of the Na₂S₂O₈. After this addition, a mixture of the remainder of monomers (5 phm AN, 5 phm MMA and 20 phm α-MS) was added in equal portions according to the schedule:
1 hr. 10 min.
2 hr. 20 min.
3 hr. 30 min.
4 hr. 40 min.
5 hr. 50 min.

Also, at the end of 3 hrs. 50 min. from the initial charge of Na₂S₂O₈, 0.5 phm of the initiator was added.

After 7 hrs. 35 min., the polymerization reached a monomer conversion of 90 percent as determined by solids measurements.

The composition of the polymeric product in weight percent was 25 AN/21 MMA/35 α-MS/20 indene and 22.5 excess percent polybutadiene.

EXAMPLE 7

A tetrapolymer was made by emulsion polymerization using the following recipe in which amounts are shown in parts by weight:

|  | Parts |
| --- | --- |
| Water | 200 |
| Acrylonitrile | 25 |
| Methyl Methacrylate | 20 |
| α-Methylstyrene | 30 |
| Indene | 25 |
| $Na_3PO_4 \cdot 12H_2O$ | 1 |
| Sodium Persulfate, $Na_2S_2O_8$ | 1.0 |
| Sodium Lauryl Sulfate | 3 |

The sodium lauryl sulfate and the sodium phosphate were dissolved in water and charged to the reactor fitted with a cooling condenser. The reactor contents were placed under a nitrogen atmosphere. The reactor was charged with a monomer mixture consisting of 20 phm acrylonitrile, 15 phm methyl methacrylate, 10 phm α-methylstyrene and 25 phm indene. The contents of the reactor were heated to 75° C. agitated with a mechanical stirrer.

Polymerization was initiated by adding 0.7 phm of the $Na_2S_2O_8$. After this addition, a mixture of the remainder of the monomers (5 phm AN, 5 phm MMA and 20 phm α-MS) was added in equal portions according to the schedule:
1 hr.
2 hrs.
3 hrs.
4 hrs.
5 hrs.

Also, at the end of 3 hours, from the initial charge of $Na_2S_2O_8$, 0.3 phm of the initator was added, and at the end of 5 hours from the initial charge 0.2 phm of the initiator was added.

After 6 hours the polymerization reached a monomer conversion of 88.7 percent as determined by solids measurements. Inherent viscosity of the tetrapolymer was 0.288.

The composition of the polymeric product in weight percent was 25 AN/21 MMA/35 α-MS/20 indene, as measured by a gas chromatography of the residual monomers.

EXAMPLE 8

A series of blends of PVC and the product of Example 4, and the annealed HDT and notched Izod values determined. Results are below:

| Blending PVC/ Agent Weight Ratio | 100/0 | 59.7/40.3 | 61.2/38.8 | 65/35 | 75/25 |
| --- | --- | --- | --- | --- | --- |
| Notched Izod ft = −lbs/in² | 0.26 | 11.6 | 11.6 | 10.9 | 7.4 |
| HDT, °C. | 73 | 93 | 91 | 90 | 87 |

EXAMPLE 9

A series of blends of PVC and the polymeric product of Examples 1–8 was made, and properties determined, as shown in the following table.

| PVC or Polymeric Product of Example: | Parts by Weight in Blend | | | | | | | |
| --- | --- | --- | --- | --- | --- | --- | --- | --- |
| PVC | 65.3 | 66.3 | 59.7 | 61.2 | 60.6 | 69.6 | 66.0 | 70 |
| 2 | 34.7 | | | | | | | |
| 1 | | 33.7 | | | | | | |
| 4 | | | 40.3 | 38.8 | | | | |
| 5 | | | | | 39.4 | | | |
| 3 | | | | | | 30.4 | | |
| 6 | | | | | | | 34.0 | |
| 7 | | | | | | | | 30 |
| Izod (ft-lb. in) | 8.4 | 10.1 | 11.6 | 11.6 | 12.5 | 8.2 | 0.69 | 0.2 |
| HDT (C., annealed) | 89 | 88 | 93 | 91 | 91 | 91 | 94 | 93.2 |
| Melt Index (gm/10 min) | 0.232 | 0.207 | 0.114 | 0.309 | 0.305 | .334 | 1.031 | 1.20 |
| Tensile Properties | | | | | | | | |
| (a) Tensile Strength (psi) | 7200 | 6960 | 6750 | 6770 | 6720 | 7130 | 8670 | 8866 |
| (b) Break elong (%) | 3.8 | 3.8 | 3.6 | 3.6 | 3.5 | 3.8 | 3.8 | 1.83 |
| (c) Modulus, psi | 397000 | 396000 | 390000 | 388000 | 380,000 | 411000 | 472,000 | 527,000 |
| Flexural Properties | | | | | | | | |
| (a) Flex Strength (psi) | 10,370 | 9640 | 9780 | 9630 | 9530 | 10,980 | 12,210 | 7830 |
| (b) Modulus, psi | 307100 | 298100 | 290000 | 288000 | 299,800 | 321700 | 362,000 | 520,000 |

EXAMPLES 10–12

Three blends of poly(vinyl chloride) were made and the properties compared. The blends were as follows:

Example 10. This is a blend of 70 parts by weight of PVC and 30 parts by weight of the tetrapolymer of Example 7, made without any rubbery polymer.

Example 11. This is a blend of the invention, of 70 parts by weight of PVC and 30 parts by weight of the polymeric additive of the invention of Example 4.

Example 12. This is a blend of 70 parts by weight of PVC, 30 parts by weight of the tetrapolymers of Example 7, and 15 parts by weight of polybutadiene rubber. Each material was in powder form, and the three materials were mixed on heated mixing rolls.

Properties are shown in the following table:

| Properties | Example 10 | Example 11 | Example 12 |
| --- | --- | --- | --- |
| Izod ft-lb/ in | 0.2 | 11.6 | 0.39 |
| HDT (annealed) °C. | 93.2 | 91 | 93 |

-continued

| Properties | Example 10 | Example 11 | Example 12 |
|---|---|---|---|
| Tensile Strength psi | 8866 | 6770 | 6080 |
| Flexural Strength psi | 7830 | 9630 | 5760 |
| Melt Index gm/10 min. | 1.20 | 0.309 | 0.582 |

EXAMPLE 13

A tetrapolymer was made by emulsion polymerization using the following recipe in which amounts are shown in part by weight:

|  | Parts |
|---|---|
| Water | 200 |
| Acrylonitrile | 20 |
| Methyl Methacrylate | 10 |
| α-Methylstyrene | 30 |
| Indene | 40 |
| $Na_3PO_4.12H_2O$ | 1 |
| Sodium Persulfate, $Na_2S_2O_8$ | 1.6 |
| Sodium Lauryl Sulfate | 3 |

The sodium lauryl sulfate and the sodium phosphate were dissolved in water and charged to the reactor fitted with a cooling condenser. The reactor contents were placed under a nitrogen atmosphere. The reactor was charged with a monomer mixture consisting of 16 phm acrylonitrile, 7.5 phm metyl methacrylate, 15.0 phm α-methylstyrene and 40 phm indene. The contents of the reactor were heated to 75° C. agitated with a mechanical stirrer.

Polymerization was initiated by adding 0.7 phm of the $Na_2S_2O_8$. After this addition, a mixture of the remainder of the monomers (4.0 phm AN, 2.5 phm MMA and 15 phm α-MS) was added in equal portions according to the schedule:
 1 hr. 20 minutes
 2 hrs. 40 minutes
 4 hrs.
 5 hrs. 20 minutes
 6 hrs. 40 minutes Also, at the end of 3 hrs 45 minutes, from the initial charge of $Na_2S_2O_8$, 0.45 phm of the initiator was added, and at the end of 5 hrs 40 minutes from the initial charge 0.45 phm of the initiator was added.

After 8.0 hours the polymerization reached a monomer conversion of 69.4 percent as determined by solids measurements.

The composition of the polymeric product in weight percent was 22.4 AN/12.4 MMA/35.2 α-MS/30 indene, as measured by gas chromatography of the residual monomers.

EXAMPLE 14

A tetrapolymer was made by emulsion polymerization using the following recipe in which amounts are shown in parts by weight:

|  | Parts |
|---|---|
| Water | 200 |
| Acrylonitrile | 20 |
| Methyl Methacrylate | 10 |
| α-Methylstyrene | 30 |
| Indene | 40 |
| $Na_3PO_4.12H_2O$ | 1 |
| Sodium Persulfate, $Na_2S_2O_8$ | 1.6 |
| Sodium Lauryl Sulfate | 3 |
| Polybutadiene Latex | 40 (solids basis) |

The sodium lauryl sulfate and the sodium phosphate were dissolved in water and charged to the reactor fitted with a cooling condenser. The reactor contents were placed under a nitrogen atmosphere. The reactor was charged with rubber latex and a monomer mixture consisting of 16 phm acrylonitrile, 7.5 phm methyl methacrylate, 15.0 phm α-methylstyrene and 40 phm indene. The contents of the reactor were heated to 75° C. agitated with a mechanical stirrer.

Polymerization was initiated by adding 0.7 phm of the $Na_2S_2O_8$. After this addition, a mixture of the remainder of the monomers (4.0 phm AN, 2.5 phm MMA and 15 phm α-MS) was added in equal portions according to the schedule:
 1 hr. 20 minutes
 2 hrs. 40 minutes
 4 hrs.
 5 hrs. 20 minutes
 6 hrs. 40 minutes Also, at the end of 3 hrs 45 minutes from the initial charge of $Na_2S_2O_8$, 0.45 phm of the initiator was added, and at the end of 5 hrs 40 minutes from the initial charge 0.45 phm of the initiator was added.

After 8.0 hours the polymerization reached a monomer conversion of 63 percent as determined by solids measurements.

The composition of the polymeric product in weight percent was 22.4 AN/12.4 MMA/35.2 α-MS/30 indene, and 63.4 excess percent polybutadiene.

EXAMPLE 15

A tetrapolymer was made by emulsion polymerization using the following recipe in which amounts are shown in parts by weight:

|  | Parts |
|---|---|
| Water | 200 |
| Acrylonitrile | 30 |
| Methyl Methacrylate | 30 |
| α-Methylstyrene | 35 |
| Indene | 5 |
| $Na_3PO_4.12H_2O$ | 1 |
| Sodium Persulfate, $Na_2S_2O_8$ | 0.4 |
| Sodium Lauryl Sulfate | 3 |

The sodium lauryl sulfate and the sodium phosphate were dissolved in water and charged to the reactor fitted with a cooling condenser. The reactor contents were placed under a nitrogen atmosphere. The reactor was charged with a monomer mixture consisting of 30 phm acrylonitrile, 12 phm methyl methacrylate, 10 phm α-methylstyrene and 5 phm indene. The contents of the reactor were heated to 75° C. agitated with a mechanical stirrer.

Polymerization was initiated by adding 0.4 phm of the $Na_2S_2O_8$. After this addition, a mixture of the remainder of the monomers (18 phm MMA and 25 phm α-MS) was added in equal portions according to the schedule:
 30 minutes
 60 minutes 90 minutes
120 minutes
150 minutes After 3.0 hours the polymerization reached a monomer conversion of 88.8 percent as determined by solids measurements.

The composition of the polymeric product in weight percent was 26.8 AN/30 MMA/38.8 α-MS/4.0 indene, as measured by gas chromatography of the residual monomers.

EXAMPLE 16

A polymer was made by emulsion polymerization using the following recipe in which amounts are shown in parts by weight:

|  | Parts |  |
| --- | --- | --- |
| Water | 200 |  |
| Acrylonitrile | 30 |  |
| Methyl Methacrylate | 30 |  |
| α-Methylstyrene | 35 |  |
| Indene | 5 |  |
| $Na_3PO_4 \cdot 12H_2O$ | 1 |  |
| Sodium Persulfate, $Na_2S_2O_8$ | 0.4 |  |
| Sodium Lauryl Sulfate | 3 |  |
| Polybutadiene Latex | 40 | (solids basis) |

The sodium lauryl sulfate and the sodium phosphate were dissolved in water and charged to the reactor fitted with a reflux condenser and a stirrer and the stirrer was started. The rubbery polybutadiene latex was charged to the reactor next and the reactor contents were placed under a nitrogen atmosphere.

The reactor was charged with part of the monomers: a mixture consisting of 30 phm acrylonitrile, 12 phm methyl methacrylate, 10 phm α-methylstyrene and 5 phm indene, and the reactor contents heated to 75° C.

Polymerization was initiated by adding 0.4 phm of the $Na_2S_2O_8$. After this addition, a mixture of the remainder of the monomers (18 phm MMA and 25 phm α-MS) was added in equal portions according to the schedule:
  30 minutes
  60 minutes
  90 minutes
  120 minutes
  150 minutes After 3 hours the polymerization reached a monomer conversion of 86.2 percent as determined by solids measurements.

The composition of the polymeric product in weight percent was 26.8 AN/30 MMA/38.8 α-MS/4.0 indene, and 46.4 excess percent polybutadiene.

EXAMPLE 17

A tetrapolymer was made by emulsion polymerization using the following recipe in which amounts are shown in parts by weight:

|  | Parts |
| --- | --- |
| Water | 200 |
| Acrylonitrile | 20 |
| Methyl Methacrylate | 40 |
| α-Methylstyrene | 5 |
| Indene | 35 |
| $Na_3PO_4 \cdot 12H_2O$ | 1 |
| Sodium Persulfate, $Na_2S_2O_8$ | 1.2 |
| Sodium Lauryl Sulfate | 3 |

The sodium lauryl sulfate and the sodium phosphate were dissolved in water and charged to the reactor fitted with a cooling condenser. The reactor contents were placed under a nitrogen atmosphere. The reactor was charged with a monomer mixture consisting of 16.0 phm acrylonitrile, 30 phm methyl methacrylate, 1.5 phm α-methylstyrene and 35 phm indene. The contents of the reactor were heated to 75° C. agitated with a mechanical stirrer.

Polymerization was initiated by adding 0.7 phm of the $Na_2S_2O_8$. After this addition, a mixture of the remainder of the monomers (4.0 phm AN, 10 phm MMA and 3.5 phm α-MS) was added in equal portions according to the schedule:
  1 hr. 5 minutes
  2 hrs. 15 minutes
  3 hrs. 25 minutes
  4 hrs. 35 minutes
  5 hrs. 45 minutes Also, at the end of 4.0 hours, from the initial charge of $Na_2S_2O_8$, 0.5 phm of the initiator was added.

After 7.0 hours the polymerization reached a monomer conversion of 67.4 percent as determined by solids measurements.

The composition of the polymeric product in weight percent was 18.0 AN/46.7 MMA/6.1 α-MS/29.2 indene, as measured by gas chromatography of the residual monomers.

EXAMPLE 18

A polymer was made by emulsion polymerization using the following recipe in which amounts are shown in parts by weight:

|  | Parts |  |
| --- | --- | --- |
| Water | 200 |  |
| Acrylonitrile | 20 |  |
| Methyl Methacrylate | 40 |  |
| Indene | 35 |  |
| α-Methylstyrene | 5 |  |
| $Na_3PO_4 \cdot 12H_2O$ | 1 |  |
| $Na_2S_2O_8$ | 1.4 |  |
| Sodium Lauryl Sulfate | 3 |  |
| Polybutadiene Latex | 40 | (solids basis) |

The sodium lauryl sulfate and the sodium phosphate were dissolved in water and charged to the reactor fitted with a reflux condenser and a stirrer, and the stirrer was started. The rubbery polybutadiene latex was charged to the reactor next and the reactor contents were placed under a nitrogen atmosphere.

The reactor was charged with a portion of the monomer mixture consisting of 16 phm acrylonitrile, 30 phm methyl methacrylate, 1.5 phm α-methylstyrene and 35 phm indene. The contents of the reactor were heated to 75° C.

Polymerization was initiated by adding 0.7 phm of the $Na_2S_2O_8$. After this addition, a mixture of the remainder of the monomers (4 phm AN, 10 phm MMA and 3.5 phm α-MS) was added in equal portions according to the schedule:
  1 hr. 15 minutes
  2 hrs. 30 minutes 3 hrs. 45 minutes
5 hrs.
6 hrs. 15 minutes Also, at the end of 3 hrs 45 minutes, from the initial charge of $Na_2S_2O_8$, 0.7 phm of the intiator was added.

After 7 hours 30 min., the polymerization reached a monomer conversion of 71.0 percent as determined by solids measurements.

The composition of the polymeric product in weight percent was 18.0 AN/46.7 MMA/6.1 α-MS/29.2 indene, and 56.3 excess percent polybutadiene.

EXAMPLE 19

A polymer was made by emulsion polymerization using the following recipe in which amounts are shown in parts by weight:

|  | Parts |  |
|---|---|---|
| Water | 200 |  |
| AN | 25 |  |
| MMA | 20 |  |
| Indene | 25 |  |
| α-MS | 30 |  |
| $Na_3PO_4.12H_2O$ | 1 |  |
| $Na_2S_2O_8$ | 1.2 |  |
| Sodium Lauryl Sulfate | 1 |  |
| Polybutadiene latex | 10.5 | (solids basis) |

The sodium lauryl sulfate and the sodium phosphate were dissolved in water and charged to a glass reactor fitted with a reflux condenser and a stirrer, and the stirrer was started. The rubbery polybutadiene latex was charged to the reactor next and the reactor contents placed under a nitrogen atmosphere.

The reactor was charged with part of the monomers: a mixture of 20 phm AN, 15 phm MMA, 10 phm α-MS and 25 phm indene, and the reactor contents heated to 75° C.

Polymerization was intiated by adding 0.7 phm of the $Na_2S_2O_8$. After this addition, a mixture of the remainder of the monomers (5 phm AN, 5 phm MMA and 20 phm α-MS) was added in equal portions according to the schedule:
1 hr. 10 minutes
2 hrs. 20 minutes
3 hrs. 30 minutes
4 hrs. 40 minutes
5 hrs. 50 minutes Also, at the end of 4 hours 30 min. from the initial charge of $Na_2S_2O_8$, 0.5 phm of the initiator was added, and at the end of 5 hours from the initial charge 0.2 phm of the initiator was added.

After 7 hours, the polymerization reached a monomer conversion of 87.4 percent as determined by solids measurements.

The composition of the polymeric product in weight percent was 25 AN/21 MMA/35 α-MS/20 indene and 12.00 excess percent polybutadiene.

EXAMPLE 20

To part of the latex made in Example 19 was added polybutadiene latex in an amount to provide 38 more excess parts of polybutadiene, and the mixed latices were freeze coagulated and processed to a dry powder. The overall blending agent composition was thus 25 AN/21 MMA 35 α-MS, 20 indene and 50 percent excess polybutadiene.

EXAMPLE 21

Some of the latex made in Example 7 was thoroughly blended with polybutadiene latex in relative amounts to provide 100 weight parts of the tetrapolymer to 50 weight parts of polybutadiene. The mixture was then freeze coagulated and processed to a dry powder. It was used to blend with PVC, and the blend compared with the PVC blends using the product of Example 20 and the product of Example 4.

EXAMPLE 22

A tetrapolymer was made by emulsion polymerization using the following recipe in which amounts are shown in parts by weight:

|  | Parts |  |
|---|---|---|
| Water | 188 |  |
| Acrylonitrile | 25 |  |
| Methyl Methacrylate | 20 |  |
| α-Methylstyrene | 30 |  |
| Indene | 25 |  |
| $Na_3PO_4.12H_2O$ | 1 |  |
| Sodium Persulfate, $Na_2S_2O_8$ | 1.2 |  |
| Sodium Lauryl Sulfate | 1.5 |  |
| SBR* Latex | 40 | (solids basis) |

*Styrene-butadiene copolymer containing 14.5 moles styrene per 85.5 moles butadiene The sodium lauryl sulfate and the sodium phosphate were dissolved in water and charged to the reactor fitted with a cooling condenser. The reactor contents were placed under a nitrogen atmosphere. The reactor was charged with the rubber latex and a monomer mixture consisting of 20 phm acrylonitrile, 15 phm methyl methacrylate, 10 phm α-methylstyrene and 25 phm indene. The contents of the reactor were heated to 75° C. agitated with a mechanical stirrer.

Polymerization was initiated by adding 0.7 phm of the $Na_2S_2O_8$. After this addition, a mixture of the remainder of the monomers (5 phm AN, 5 phm MMA and 20 phm α-MS) was added in equal portions according to the schedule:
1 hr.
2 hrs.
3 hrs.
4 hrs.
5 hrs.

Also, at the end of 3 hours, from the initial charge of $Na_2S_2O_8$, 0.3 phm of the initiator was added, and at the end of 5 hours from the initial charge 0.2 phm of the initiator was added.

After 8 hours the polymerization reached a monomer conversion of 50 percent as determined by solids measurements.

The composition of the polymeric product in weight percent was 25 AN/21 MMA/35 α-MS/20 indene, and 80% excess percent butadiene-styrene copolymer.

In the following table are shown the properties of blends made using Examples 13–22 products, as well as the properties of the PVC compound without any polymeric blending agent. The compositions have either 25 or 35 parts by weight of the blending agent and 75 to 65 parts by weight of PVC, respectively, per 100 parts of PVC plus polymeric blending agent.

| Example No. | Blending Agent of Example | Parts Blending Agent | HDT °C. | Melt Index (g/10 mins) | Tensile Strength psi × 10⁻³ | Flexural Strength psi × 10⁻³ | Flexural Modulus psi × 10⁻³ | Notched Izod (ft-lb/in) |
|---|---|---|---|---|---|---|---|---|
| | | | | | | | | |

PROPERTIES OF PVC WITH BLENDING AGENT

| Example No. | Blending Agent of Example | Parts Blending Agent | HDT °C. | Melt Index (g/10 mins) | Tensile Strength psi × $10^{-3}$ | Flexural Strength psi × $10^{-3}$ | Flexural Modulus psi × $10^{-3}$ | Notched Izod (ft-lb/in) |
|---|---|---|---|---|---|---|---|---|
| 23 | 13 | 25 | 87.6 | 1.66 | 9.2 | 13.0 | 465.0 | 0.36 |
| 24 | 14 | 25 | 83.8 | 0.26 | 6.4 | 10.0 | 325.0 | 3.03 |
| 25 | 14 | 35 | 90.2 | 0.25 | 5.8 | 9.2 | 307.0 | 4.18 |
| 26 | 15 | 25 | 84.1 | 0.88 | 8.7 | 14.0 | 448.0 | 0.32 |
| 27 | 16 | 25 | 79.5 | 0.16 | 6.6 | 10.9 | 362.0 | 12.22 |
| 28 | 16 | 35 | 82.5 | 0.10 | 6.2 | 10.4 | 333.0 | 11.55 |
| 29 | 17 | 25 | 84.0 | 3.01 | 9.0 | 14.0 | 458.0 | 0.36 |
| 30 | 18 | 25 | 84.0 | 0.21 | 6.5 | 10.5 | 347.0 | 9.55 |
| 31 | 18 | 35 | 87.0 | 0.22 | 6.0 | 9.5 | 317.0 | 10.82 |
| 32 | 19 | 25 | 90.1 | 0.82 | 8.6 | 13.0 | 392.0 | 0.51 |
| 33 | 19 | 35 | 94.4 | 1.29 | 8.2 | 13.0 | 418.0 | 0.33 |
| 34 | 20 | 25 | 85.7 | 0.53 | 6.2 | 9.8 | 335.0 | 0.77 |
| 35 | 20 | 35 | 92.4 | 0.52 | 5.7 | 9.2 | 326.0 | 1.55 |
| 36 | 21 | 25 | 86.1 | 0.50 | 6.1 | 9.8 | 348.0 | 0.85 |
| 37 | 21 | 35 | 88.4 | 0.46 | 5.5 | 8.6 | 305.0 | 0.75 |
| 38 | 22 | 25 | 84.3 | 2.60 | 6.0 | 9.3 | 312.0 | 2.14 |
| 39 | 22 | 35 | 88.4 | 4.40 | 5.1 | 8.2 | 282.0 | 1.86 |
| 40 | PVC alone | | 73 | 0.26 | 8.6 | 13.6 | 410.0 | 0.20 |

As will be evident to those skilled in the art various modifications of this invention can be made or followed in the light of the foregoing disclosure and discussion without departing from the spirit and scope of the disclosure or from the scope of the claims.

We claim:

1. Normally solid polymers that are the result of addition copolymerization of the monomers acrylonitrile, methyl methacrylate, α-methylstyrene and/or styrene, and indene in the presence of a preformed unsaturated rubbery polymer, said polymers containing 10–200 parts by weight rubbery polymer, 10–40 parts by weight acrylonitrile, 5–50 parts by weight methyl methacrylate, 5–45 parts by weight of one or both of styrene and α-methylstyrene and 4–45 parts by weight indene in the polymer structure, per 100 parts by weight of the total parts of acrylonitrile, methyl methacrylate, styrene, α-methylstyrene and indene combined in said polymer structure.

2. Polymers of claim 1 wherein the parts by weight are as follows:
   rubbery polymer: 16–120
   acrylonitrile: 15–30
   methyl methacrylate: 10–50
   styrene and/or α-methylstyrene: 5–40
   indene: 10–45.

3. A composition which is an intimate mixture of
   (a) 50–98 parts by weight of a vinyl chloride polymer having an inherent viscosity of at least 0.4 and
   (b) 50–2 parts by weight of the product of claim 1.

4. A composition which is an intimate mixture of
   (a) 50–98 parts by weight of a vinyl chloride polymer having an inherent viscosity of at least 0.4 and
   (b) 50–2 parts by weight of the product of claim 2.

* * * * *